United States Patent
Mennerat et al.

(10) Patent No.: US 9,464,698 B2
(45) Date of Patent: Oct. 11, 2016

(54) ECCENTRIC IDLER PULLEY

(75) Inventors: Thomas Mennerat, Herzogenaurach (DE); Susanne Sporl, Forchheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 136 days.

(21) Appl. No.: 13/820,248

(22) PCT Filed: Jun. 30, 2011

(86) PCT No.: PCT/EP2011/061019
§ 371 (c)(1),
(2), (4) Date: Mar. 1, 2013

(87) PCT Pub. No.: WO2012/028354
PCT Pub. Date: Mar. 8, 2012

(65) Prior Publication Data
US 2013/0165284 A1 Jun. 27, 2013

(30) Foreign Application Priority Data
Sep. 3, 2010 (DE) .................. 10 2010 036 253

(51) Int. Cl.
*F16H 7/12* (2006.01)
*F16H 7/08* (2006.01)

(52) U.S. Cl.
CPC .............. *F16H 7/1281* (2013.01); *F16H 7/12* (2013.01); *F16H 2007/088* (2013.01); *F16H 2007/0893* (2013.01)

(58) Field of Classification Search
CPC ................. F16H 2007/0846; F16H 7/1281; F16H 7/12

USPC .................................. 474/112, 135
See application file for complete search history.

(56) References Cited

U.S. PATENT DOCUMENTS

| | | | |
|---|---|---|---|
| 2,337,591 A * | 12/1943 | Coulson | 474/112 |
| 4,571,222 A * | 2/1986 | Brandenstein et al. | 474/112 |
| 4,721,495 A * | 1/1988 | Kan et al. | 474/135 |
| 4,808,148 A * | 2/1989 | Holtz | 474/112 |
| 4,917,655 A * | 4/1990 | Martin | 474/112 |
| 4,923,434 A * | 5/1990 | Nemirovsky | 474/101 |
| 5,266,067 A * | 11/1993 | Gapco | 474/112 |
| 5,470,279 A | 11/1995 | Brandenstein et al. | |
| 5,820,503 A | 10/1998 | Bruchner et al. | |
| 6,416,435 B1 | 7/2002 | Szatkowski et al. | |
| 6,659,896 B1 | 12/2003 | Stief et al. | |

(Continued)

FOREIGN PATENT DOCUMENTS

CN 201152347 Y 11/2008
CN 101755147 A 6/2010

(Continued)

*Primary Examiner* — Michael Riegelman
(74) *Attorney, Agent, or Firm* — Volpe and Koenig, P.C.

(57) ABSTRACT

An idler pulley (1) of a traction mechanism drive, on which a traction mechanism (24), such as a belt or chain, is guided, and which idler pulley is adjustable via an adjusting eccentric (5) and can be fastened to a machine part (2) in conjunction with a fastening means (8). The adjusting eccentric (5) and the fastening means (8) together form a fixing device (17) with which at least one end position of the adjusting eccentric (5) and consequently of the idler pulley (1) can be defined. For this purpose, the fixing device (17) comprises at least one lug (15) which is oriented radially or axially and interacts with at least one stop (16) of the associated further component.

4 Claims, 3 Drawing Sheets

(56) References Cited

U.S. PATENT DOCUMENTS

| | | | |
|---|---|---|---|
| 7,637,829 B2* | 12/2009 | Stone et al. | 474/112 |
| 7,874,950 B2* | 1/2011 | Lehtovaara et al. | 474/135 |
| 7,980,976 B2* | 7/2011 | Stepniak et al. | 474/112 |
| 7,993,226 B2* | 8/2011 | Mack et al. | 474/135 |
| 8,202,183 B2* | 6/2012 | Riu | 474/94 |
| 8,562,467 B2* | 10/2013 | Mennerat et al. | 474/135 |
| 8,641,564 B2* | 2/2014 | Rolando et al. | 474/112 |
| 8,690,718 B2* | 4/2014 | Cantatore | 474/111 |
| 2008/0139353 A1* | 6/2008 | Stepniak et al. | 474/112 |
| 2008/0234083 A1* | 9/2008 | Haenbeukers et al. | 474/135 |
| 2010/0105508 A1* | 4/2010 | Mennerat et al. | 474/135 |
| 2014/0073467 A1* | 3/2014 | Doering | 474/112 |

FOREIGN PATENT DOCUMENTS

| | | |
|---|---|---|
| DE | 19535966 | 4/1996 |
| DE | 10043840 | 3/2002 |
| DE | 102006058206 A1 | 6/2008 |
| EP | 0826906 A2 | 3/1998 |

* cited by examiner

ECCENTRIC IDLER PULLEY

FIELD OF THE INVENTION

The present invention relates to an idler pulley of a traction mechanism drive, on which a traction mechanism, such as a belt or chain, is guided. To adjust or set the idler pulley, a setting eccentric is provided, via which, in conjunction with a fixed fastening means, the idler pulley can be fastened to a machine part in different positions.

BACKGROUND

Idler pulleys or deflecting pulleys of traction mechanism drives are intended for ensuring a defined prestress of the traction mechanism and as slip-free a belt drive as possible. Idler pulleys or deflecting pulleys of this type are consequently also designated as a deflection unit.

In internal combustion engines, traction mechanisms as toothed belts for the drive of camshafts or as V-belt for the drive of secondary assemblies are known. Idler or deflecting pulleys or deflection units form important elements of these traction mechanisms. One object of these components is to ensure a minimum looping of the traction mechanism on the belt pulleys in order to achieve as slip-free a drive as possible. Furthermore, deflecting elements are used in order to provide a defined traction mechanism drive layout, with the result that the traction mechanism can be guided according to a contour defined by the design of the internal combustion engine.

DE 100 43 840 A1 discloses a deflecting pulley or idler pulley composed of a rolling bearing, in the inner ring of which is inserted a threaded fastener for fastening purposes which, furthermore, is guided through a spacer sleeve determining an axial distance of the deflecting pulley from a housing of the internal combustion engine. The rolling bearing is surrounded on the outside by a running disk which is produced from plastic and which may also be designated as a running roller. The running disk is fastened positively to an outer ring of the rolling bearing via a hub. In the installed state of the deflecting or idler pulley, the traction mechanism of the traction mechanism is guided on the running disk.

Furthermore, idler pulleys for traction mechanisms are known, in which setting is carried out by means of a rotational displacement of the idler pulley axis of rotation about a pivot axis introduced within the outside diameter of the idler pulley.

SUMMARY

The object of the invention is to fix an eccentrically settable idler pulley in defined positions.

To achieve this set object, according to the invention, a fixing device is provided, by means of which at least one end position of the idler pulley can be defined. The fixing device formed jointly by the setting eccentric and by the fastening means comprises at least one radially or axially oriented extension which cooperates with at least one stop of the associated further component. The concept according to the invention makes it possible to fix the idler pulley in different positions, for example in order to simplify the mounting of the traction mechanism or to implement a functionally reliable limit stop between the setting eccentric and the fastening means in a nominal operating position. The fixing device according to the invention, involving high functionality, can be produced cost-effectively and can be mounted in a simple way and, overall, therefore affords a cost-effective solution.

According to an advantageous refinement of the invention, to produce the fixing device the fastening means is assigned a radial extension which cooperates with two stops of the setting eccentric which are arranged so as to be offset angularly to one another, in order to fix a defined end position of the idler pulley. Preferably, the radial extension of the fastening means is assigned two stops which are positioned on the setting eccentric so as to be offset angularly to one another and the position of which at the same time defines the adjustment range of the idler pulley. Further influence upon the adjustment range of the idler pulley or its end position can be exerted by the shaping and the angular dimension of the radial extension of the fastening means.

An alternatively configured fixing device comprises a fastening means with an axially oriented extension which engages positively into an annular groove of the setting eccentric. It is appropriate in this case at the same time to design the end regions of the annular groove as a stop. The annular groove forming a segment of an arc of a circle extends over an angular dimension which defines the maximum adjustment range of the setting eccentric and consequently of the idler pulley.

As a preferred fastening means, a threaded fastener is provided which is inserted together with a guide bush in a longitudinal bore introduced off-center in the setting eccentric, one rim of the guide bush having a radial extension cooperating with the stop of the setting eccentric.

Alternatively to a guide bush, it is appropriate, for example, to provide the fixing device according to the invention directly between the threaded fastener and the setting eccentric. According to a preferred version, the threaded fastener, in particular the screw head, comprises a radial extension which engages positively into a clearance of the setting eccentric, said clearance forming at least one stop.

To provide an end position of the idler pulley which corresponds to the nominal operating position, the fixing device makes it possible to have a setting in which an effective lever arm S>0 is established between an axis running through the axis of rotation of the idler pulley and the pivot axis of the setting eccentric and a resultant belt force $F_R$, directed through the axis of rotation of the idler pulley, of the traction mechanism. Advantageously, in this case, the extension of the setting eccentric is supported nonpositively and/or positively on the stop of the fastening means, thus affording a functionally optimized setting of the idler pulley in the operating state.

In an end position intended for mounting the traction mechanism, the fixing device according to the invention affords the possibility that a lever arm S>0 is established between a first vertical axis A assigned to a pivot axis of the setting eccentric and a second vertical axis B assigned to the axis of rotation of the idler pulley. Consequently, while the traction mechanism is being mounted, a stable end position of the idler pulley can advantageously be implemented.

Furthermore, the set-up according to the invention of the fixing device provides for having, in a dead center position, identity of position between the pivot axis of the setting eccentric, the axis of rotation of the idler pulley and the force direction of a resultant traction mechanism force. Consequently, in this position, no effective lever arm is established between the pivot axis of the setting eccentric or the axis of rotation of the idler pulley and the direction of the resultant belt force. To implement an end position optimal for functioning and corresponding to the nominal operating position of the idler pulley, an angle $\beta \geq 20°$ is provided between the dead center position and a position in which the extension of the fastening means is supported on the stop of the setting eccentric.

To achieve the set object, according to the invention, there is provision whereby, in an end position, the setting eccentric of the idler pulley cooperates directly or indirectly via a radial extension with a stop of the fixed machine part. Preferably, for this purpose, the machine part to which the idler pulley is fixed via the fastening means is provided.

Furthermore, alternatively to a deflection unit, such as an idler or deflecting pulley, the idler pulley according to the invention may be used as idler pulley of a tension system, by means of which the traction mechanism of a traction mechanism can be prestressed automatically.

A preferred adjustment range $\alpha \geq 150°$ is provided for the setting eccentric between the mounting position and the nominal operating position.

The set-up of the idler pulley according to the invention comprises a running disk arranged rotatably on the setting eccentric via a rolling bearing, the setting eccentric being fastened to the machine part via a fastening means. To simplify the mounting of the idler pulley, a fastening means is provided which is fixed rotationally to the machine part in the installation state. For this purpose, it is appropriate to have, for example, a locally projecting extension which is offset radially with respect to the threaded fastener fastening and via which the fastening means engages positively into a matching receptacle of the machine part.

BRIEF DESCRIPTION OF THE DRAWINGS

Further measures of the invention are explained in more detail below in conjunction with the description of a preferred exemplary embodiment. In the drawings.

DETAILED DESCRIPTION OF THE PREFERRED EMBODIMENTS

Figure 1:
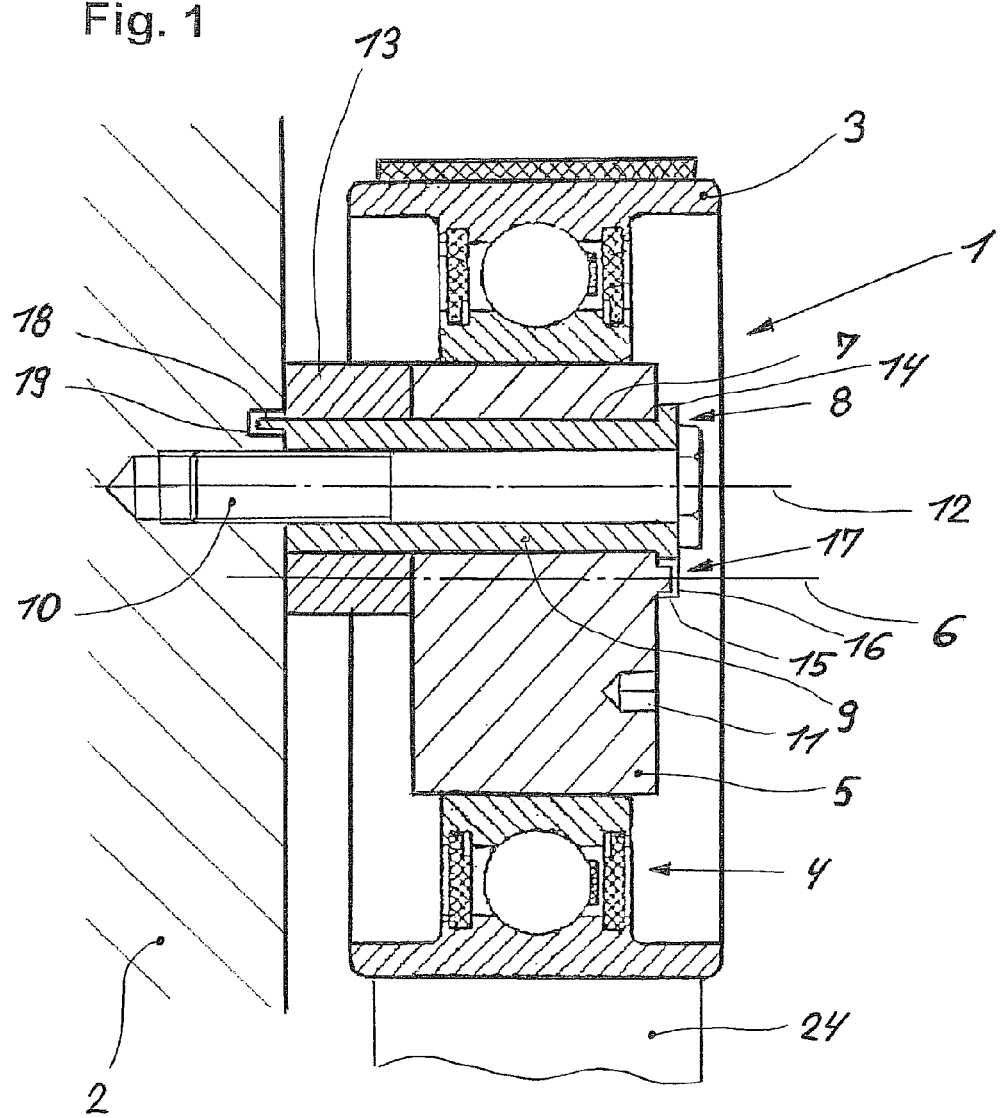
FIG. 1 shows a sectional illustration of an idler pulley with a fixing device according to the invention.

FIG. 1 shows an idler pulley 1, deflecting pulley or deflection unit in the installation state, which is operatively connected to a traction mechanism 24 which is assigned to a traction mechanism drive not depicted in FIG. 1. The idler pulley 1 comprises a running disk 3 which is surrounded at least in regions by the traction mechanism and which is arranged rotatably on a setting eccentric 5 via a rolling bearing 4. A fastening means 8 is inserted, offset radially to an axis of rotation 6 of the idler pulley 1, in a longitudinal bore 7 of the setting eccentric and is comprised of a guide bush 9 supported on a machine part 2 and of a threaded fastener 10 screwed in the machine part 2. When the threaded fastener 10 is released, the setting eccentric 5 can be set about a pivot axis 12 of the fastening means 8, for example in conjunction with a setting tool capable of being inserted in a tool receptacle 11. To set an axial distance of the idler pulley 1 from the machine part 2, a spacer sleeve 13 surrounding the guide bush 9 is provided. On the side facing away from the machine part 2, the guide bush 9 forms a peripheral rim 14 having an extension 15 locally directed radially outward. Together with an axially projecting stop 16 of the setting eccentric 5, the extension 15 forms a fixing device 17 which limits the setting or adjustment of the setting eccentric 5. For rotational fixing, the guide bush 9 includes a fixing pin 18 which engages positively into a matching clearance 19 of the machine part 2.

Alternatively to FIG. 1, the fixing device according to the invention can also be implemented directly between the threaded fastener 10 and the setting eccentric 5 and therefore without a guide sleeve 9. For this purpose, it is appropriate, for example, that a fastener head of the threaded fastener 10 engages positively with a radial extension into a region between two spaced-apart, axially projecting extensions of the setting eccentric 5 which form stops.

Figure 2:
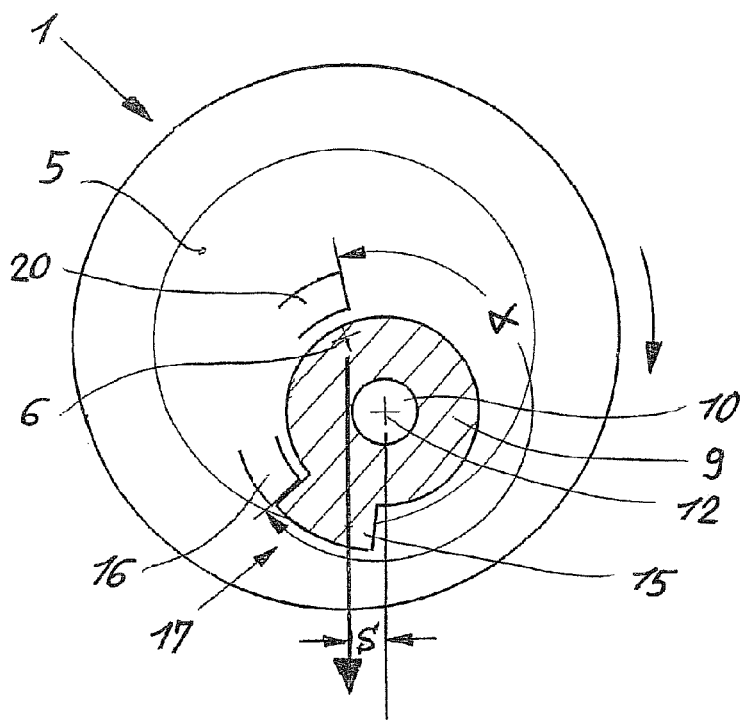
FIG. 2 shows a front view of an idler pulley with a setting eccentric and an associated fixing device in a mounting position.

FIG. 2 shows the idler pulley 1 rotated about the pivot axis 12 of the setting eccentric 5 into an end position, a mounting position, in which the traction mechanism, the belt, can be mounted more simply. In this position, the extension 15 of the guide bush 9 is supported on the stop 16. In this idler pulley position, a lever arm S>0 is formed between a vertical axis A led through the pivot axis 15 and a vertical axis B of the axis of rotation 6, said lever arm triggering an angular momentum counterclockwise on account of the dead weight of the idler pulley 1, with the result that the stop 16 is supported nonpositively on the extension 15 so as to provide a stable position. After the mounting of the belt has taken place, the setting eccentric 5 and consequently the idler pulley 1 can be rotated in the direction of the arrow, clockwise, in order to set a desired prestress of the traction mechanism. The maximum adjustment angle $\alpha \geq 150°$ of the setting eccentric 5, reduced by the amount of width of the extension 15, is limited by a further stop 20 of the setting eccentric 5.

Figure 3:
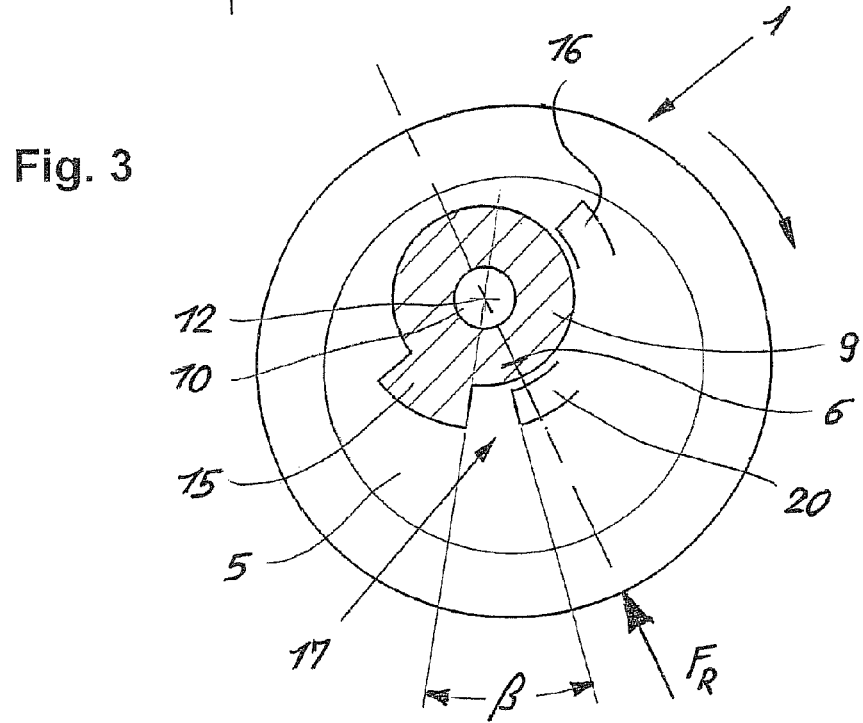
FIG. 3 shows the idler pulley according to FIG. 2 with the fixing device in a dead center position.
Figure 4:
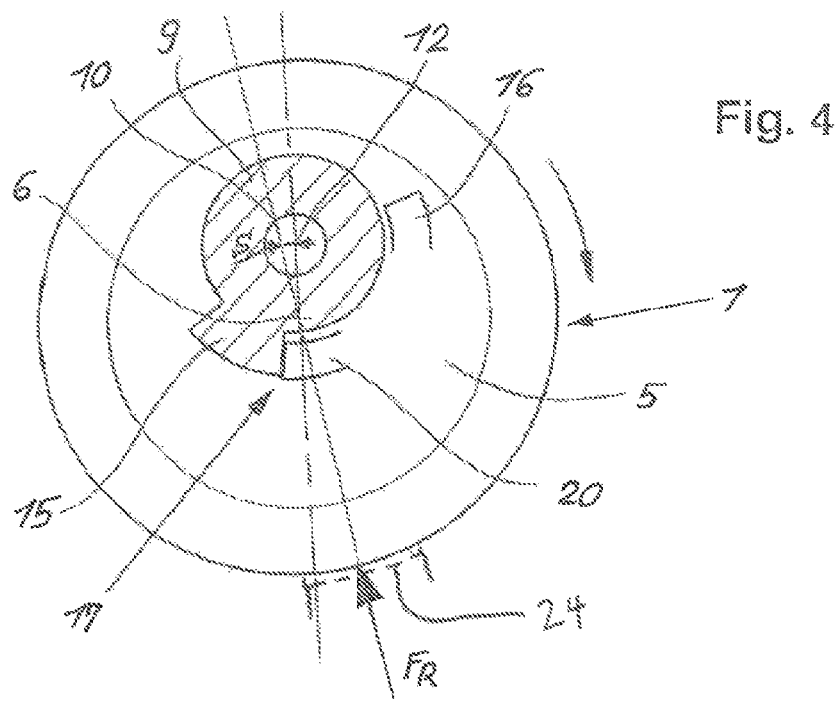
FIG. 4 shows the setting eccentric according to FIG. 2 with the fixing device in an operating position.

FIGS. 3 and 4 show alternative settings of the setting eccentric 5. In this case, particulars and regions which have equivalent functions to previously described particulars and regions are given the same reference numerals and are not explained in detail again.

FIG. 3 shows a dead center position of the setting eccentric 5 which can be reached by the clockwise rotation of the setting eccentric 5, until identity of position between the pivot axis 15, the axis of rotation 6 and a force direction of the resultant belt force $F_R$ or traction mechanism force is established. In this position of the setting eccentric 5, an angle $\beta \geq 20°$ between the stop 20 of the setting eccentric 5 and the extension 15 is obtained.

In the nominal operating position of the idler pulley 1 according to FIG. 4, the stop 20 of the setting eccentric 5 is supported on the extension 15 of the guide bush 9 and the traction mechanism 24 (belt) is pre-stressed. In this end position, an effective lever arm S>0 is formed between the force direction, running through the axis of rotation 6 of the idler pulley 1, of the resultant belt force $F_R$ of the traction mechanism 24 and a longitudinal axis running through the pivot axis 12 of the setting eccentric 5 and the axis of rotation 6 of the setting eccentric 5. On account of this geometric arrangement, in the nominal operating position, the stop 20 is supported nonpositively on the extension 15 in order to provide a stable position.

Figure 5:
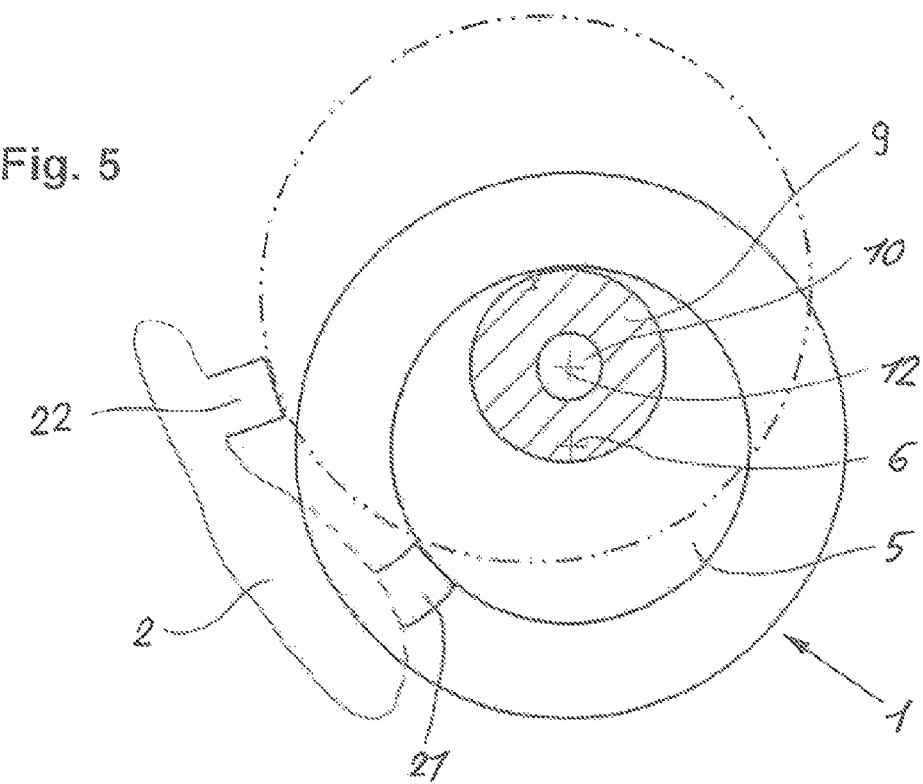
FIG. 5 shows an idler pulley in which the fixing device is provided between the setting eccentric and the machine part.

Alternatively to the previous exemplary embodiment described, FIG. 5 shows the idler pulley 1, the fixing device 21 of which comprises stops 22, 23 which are assigned to the machine part 2 and which cooperate directly with the setting eccentric 5. The support of the setting eccentric 5 on the stop 21 corresponds to the nominal operating position. In the further mounting position illustrated by dashes and dots, the setting eccentric 5 is supported on the stop 22.

LIST OF REFERENCE NUMERALS

1 Idler pulley
2 Machine part

3 Running disk
4 Rolling bearing
5 Setting eccentric
6 Axis of rotation
7 Longitudinal bore
8 Fastening means
9 Guide bush
10 Threaded fastener
11 Tool receptacle
12 Pivot axis
13 Spacer sleeve
14 Rim
15 Extension
16 Stop
17 Fixing device
18 Fixing pin
19 Clearance
20 Stop
21 Fixing device
22 Stop
23 Stop
24 Traction mechanism

The invention claimed is:

1. A belt drive comprising:
a belt and an idler pulley on which said belt is guided, said idler pulley comprising a setting eccentric for adjustable fastening in conjunction with a fastener to a machine part, the setting eccentric and the fastener together form a fixing device, by which a first rotational end position and a second rotational end position of the setting eccentric and the idler pulley are defined, the fixing device having an extension which cooperates with a stop of the setting eccentric,
(1) in the first rotational end position of the setting eccentric, the idler pulley is in a pre-installed state such that the stop is supported against the extension due to dead weight of the idler pulley, and
(2) in the second rotational end position of the setting eccentric, the idler pulley is positioned in an operating position in which the belt is pre-stressed by the idler pulley and a further stop of the setting eccentric is supported on the extension in a stable position.

2. The belt drive as claimed in claim 1, wherein in a dead center position of the idler pulley, identity of position between a pivot axis of the setting eccentric, an axis of rotation of the idler pulley, and a force direction of the resultant belt force $F_R$ of the belt is established, and in the dead center position of the idler pulley, an angle $\gamma \geq 20°$ between the extension of the fastener or a guide bush and the further stop of the setting eccentric is established.

3. The belt drive as claimed in claim 1, wherein an adjustment range $\alpha \geq 150°$ is provided for the setting eccentric between the first rotational end position and the second rotational end position.

4. The belt drive as claimed in claim 1, wherein a guide bush of the fastener is fixed in position on the machine part in an installation state of the idler pulley.

* * * * *